(12) United States Patent
Bauckman

(10) Patent No.: US 6,484,743 B2
(45) Date of Patent: Nov. 26, 2002

(54) FLOW CONTROL ASSEMBLY

(75) Inventor: Mark Bauckman, Deerfield Beach, FL (US)

(73) Assignee: Zodiac Pool Care, Inc., Pompano Beach, FL (US)

( * ) Notice: Subject to any disclaimer, the term of this patent is extended or adjusted under 35 U.S.C. 154(b) by 0 days.

(21) Appl. No.: 09/829,163

(22) Filed: Apr. 9, 2001

(65) Prior Publication Data

US 2002/0144728 A1 Oct. 10, 2002

(51) Int. Cl.[7] .................................................. G05D 7/01
(52) U.S. Cl. ........................ 137/114; 137/269; 137/495; 137/907; 15/1.7
(58) Field of Search ................................ 137/114, 269, 137/271, 605, 907, 495, 527; 251/83; 15/1.74

(56) References Cited

U.S. PATENT DOCUMENTS

| | | | | |
|---|---|---|---|---|
| 3,115,873 A | * | 12/1963 | Hahn et al. ................. | 123/572 |
| 4,088,150 A | * | 5/1978 | Seratto ........................ | 137/499 |
| 4,368,751 A | * | 1/1983 | Hickenlooper et al. ..... | 137/527 |
| 4,378,254 A | | 3/1983 | Chauvier | |
| 4,905,724 A | * | 3/1990 | Ranalletta et al. .......... | 137/114 |
| 5,249,596 A | * | 10/1993 | Hickenlooper et al. ..... | 137/334 |
| 5,337,433 A | | 8/1994 | Gould et al. | |
| 5,570,713 A | | 11/1996 | Stoltz et al. ................. | 137/114 |
| 5,904,171 A | | 5/1999 | Stable et al. | |

* cited by examiner

Primary Examiner—Stephen M. Hepperle
(74) Attorney, Agent, or Firm—Dean W. Russell; Kilpatrick Stockton LLP

(57) ABSTRACT

Assemblies for control of fluid flow are described. The assemblies permit angular adjustment of resilient biasing mechanisms through translation of one of their ends along the assembly exteriors. Although the resilient mechanisms normally facilitate covering a bypass inlet so as to close it with a flap, the mechanisms may be latched with the bypass inlet open.

20 Claims, 4 Drawing Sheets

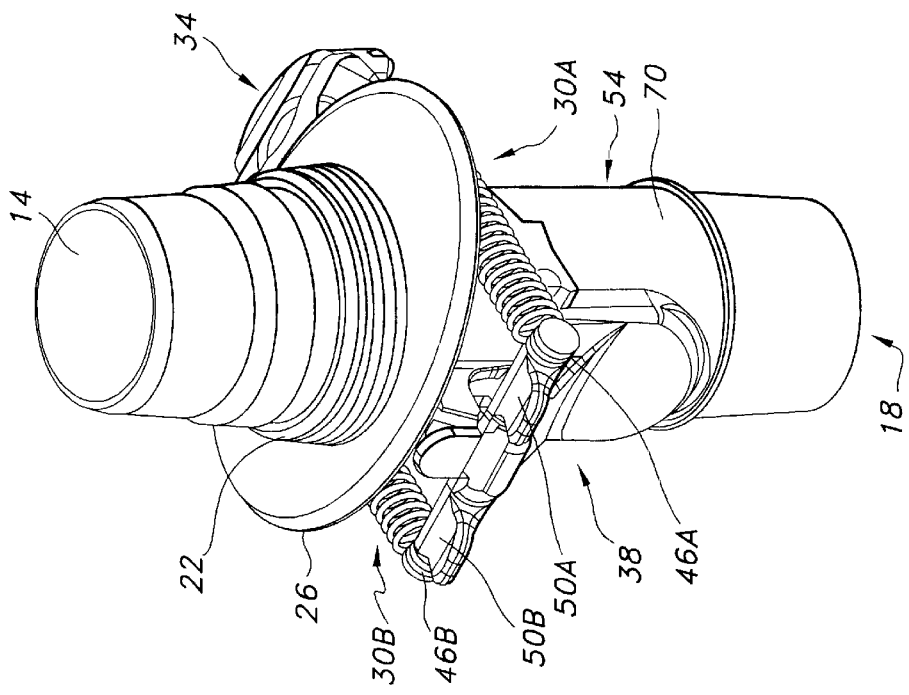
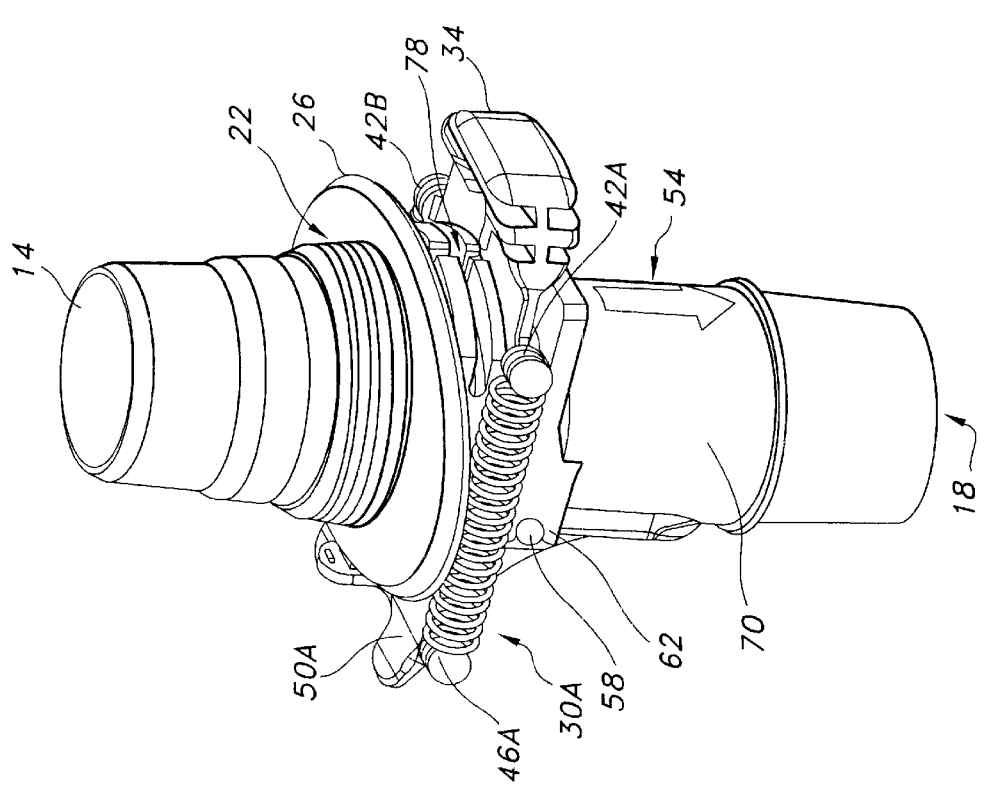

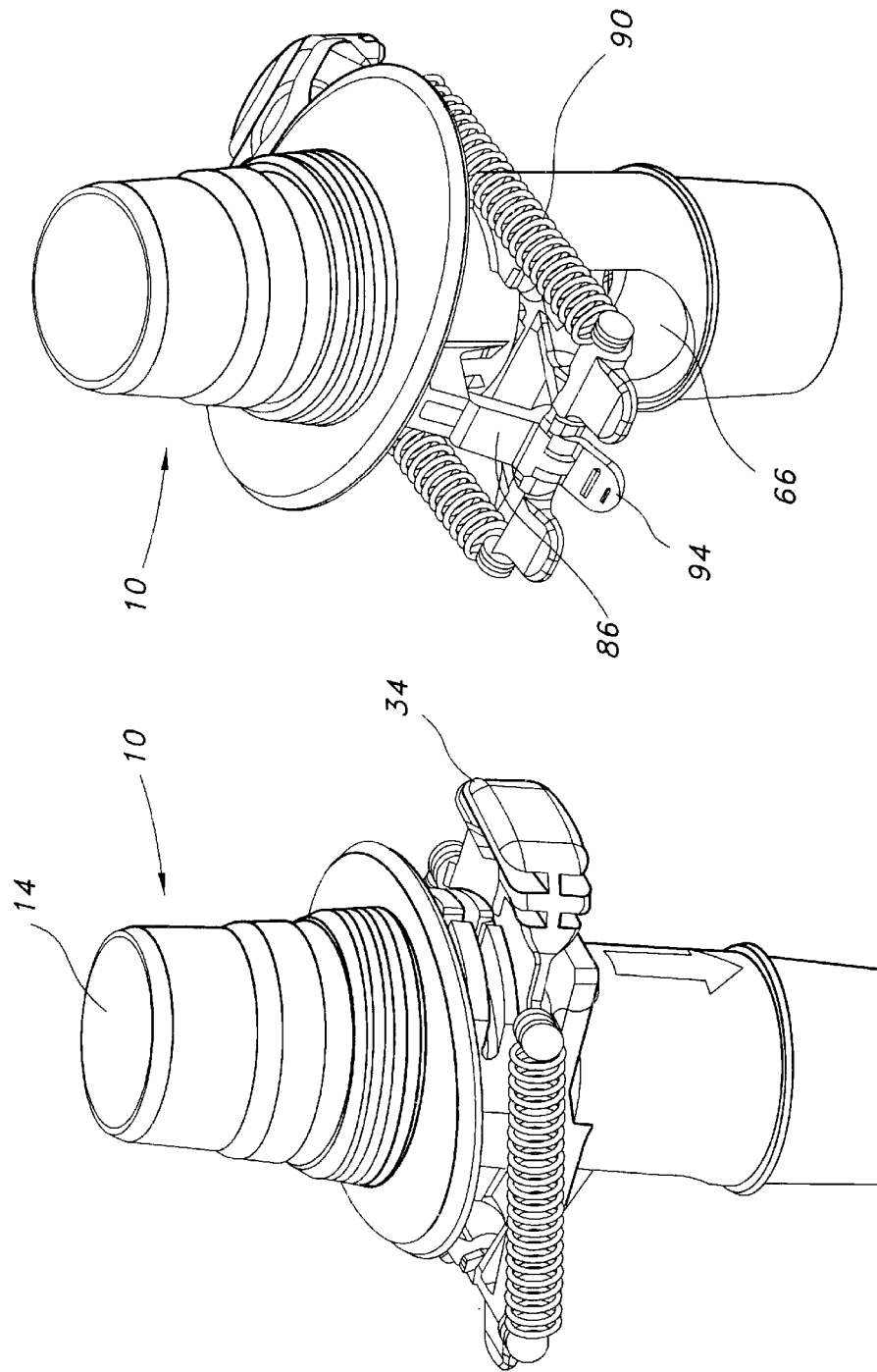

FLOW CONTROL ASSEMBLY

FIELD OF THE INVENTION

The present invention relates to assemblies through which fluid may flow and more particularly to valving mechanisms controlling, or regulating, fluid flow in connection with swimming pool water cleaning (or other) systems.

BACKGROUND OF THE INVENTION

Commonly-owned U.S. Pat. No. 5,570,713 to Stoltz, et al. discloses, among other things, embodiments of a flow control weir valve. Especially (although not necessarily exclusively) useful in systems for cleaning swimming pool water, the valve of the Stoltz patent typically includes both an inlet and an outlet as well as a covered bypass inlet. Resilient springs may be employed to bias the cover so that it closes the bypass inlet, normally rendering it inoperative. As noted in the Stoltz patent, however:

> When fluid flows within the valve, the closing force generated by the springs may be overcome by the low pressure generated within the valve, which thus allows the ambient environment to force the cover at least partially open once the fluid flow rate passes a threshold value. . . . The cover is sufficiently responsive to allow a relief flow through the bypass inlet that satisfies rapid and wide-ranging pressure variations created within a cleaning system to which the valve may be attached.

See Stoltz, Abstract, 11. 7–17.

Valve designs illustrated in the Stoltz patent permit adjustment of the position of their springs relative to the bypass cover or flap. This adjustment may occur because the springs are connected to an anchor, which anchor is moveable along a sloped exterior surface between uses of the valve. So moving the anchor changes the angle of the axis of the springs relative to the cover, although the length of the spring may change as well. See id., col. 8, 1. 58 through col. 9, 1. 4.

In use, likewise, displacement of the springs is linear rather than angular. According to the Stoltz patent, although the bypass cover is displaceable a significant distance when operational, the associated spring > undergoes only a small displacement because it is positioned at approximately between a 30° to 45° angle (depending on where the anchor is positioned) relative to a horizontal axis passing through the pivot point. . . . [T]he less the distance [the] spring needs to extend, the less force needed to displace it. Thus, the flap will be more sensitive to the changes in pressure within the valve since small pressure variations may exert sufficient opening force on the flap to displace the spring the small amount needed to move the flap to a more or fully open position. Id., col. 9, 11. 7–17 (numerals omitted).

SUMMARY OF THE INVENTION

Although commercially useful, valves consistent with the Stoltz patent are not exclusively capable of functioning as fluid-control mechanisms. The present invention thus provides alternative flow-control assemblies which, like those of the Stoltz patent, can (but need not necessarily) be used with systems for cleaning water in swimming pools. The alternative assemblies likewise may include an inlet, an outlet, and a bypass inlet, again covered by a flap or similar component biased normally as to close the bypass inlet. Such bias further may be provided by one or more springs, although other biasing mechanisms known to those skilled in the relevant art may be employed instead.

Based at one end of each of the springs is a repositionable anchor. However, unlike that shown in the Stoltz patent, the anchor of the present invention is not moveable along a sloped surface of the valve exterior, but rather is repositionable along a regular cylindrical exterior. As a consequence, the anchored ends of the springs always remain at an endpoint of lines spanning the diameter of the cylinder, regardless of the position of the anchor. Embodiments of the innovative assemblies include three slots, or grooves, into which the anchor may be fitted, although those skilled in the art will recognize more or fewer slots may be provided as necessary or desired. The assemblies likewise need not necessarily have any cylindrical portion and may be shaped or configured otherwise as appropriate.

Attached to protruding arms of a cover are the other ends of the one or more springs. In addition to protruding arms, the cover may comprise a flap placed at least partially within the bypass inlet and prongs fitted into corresponding recesses in the assembly. An imaginary line connecting the prongs may be the axis about which the cover pivots in use between a first position—in which the flap closes the bypass inlet—and a second position in which the bypass inlet is functional. To prevent undesired rotation of the cover beyond the first position, the flap may include a stop adapted to engage the interior surface of the valving assembly.

Versions of the present invention additionally may include means for latching the cover in its second position so as to open the bypass inlet indefinitely. Numerous latching mechanisms could be suitable depending on relevant circumstances; typically, however, the latching will be performed mechanically utilizing a tongue connected to the pivotable cover. Interposed between the arms of the cover, the tongue itself may be configured so as to rotate between a first position—where it is inoperable—and a second position in which it engages a partial collar and thus retains the cover in its second, or open, position.

Assemblies of the present invention may be adapted for in-line placement as, for example, between two lengths of hose, a hose and a fitting, or between two fittings. Depending on their intended placements, the assemblies may have ribbed or threaded (or otherwise featured) inlets or outlets (or both) to facilitate the in-line connections. Yet additionally, if an assembly is to be positioned against a fitting or wall, a plate extending beyond the exterior circumference of the main body of the assembly may be included to provide a grasping surface or to contact the wall or fitting and help fix the position of the assembly relative thereto.

It thus is an object of the present invention to provide assemblies for controlling fluid flow.

It also is an object of the present invention to provide fluid-flow control assemblies in which a flap may be used to cover a bypass inlet.

It is a further object of the present invention to provide fluid-flow control assemblies in which the flap is normally biased so as to close the bypass inlet.

It is another object of the present invention to provide assemblies in which the flap can be latched, mechanically or otherwise, to maintain the bypass inlet in an open condition.

It is also an object of the present invention to provide fluid-flow control assemblies in which one end of one or more biasing means may be moved along the exteriors of the assemblies.

It is yet another object of the present invention to provide fluid-flow control assemblies in which translating an end of the biasing means along the assembly exterior changes predominantly the angle formed by the biasing means and cover.

Other objects, features, and advantages of the present invention will be apparent to those skilled in the art with reference to the remaining text and drawings of this application.

BRIEF DESCRIPTION OF THE DRAWINGS

FIGS. 1A–D are various views of an exemplary fluid-flow control assembly of the present invention with its bypass inlet closed.

FIGS. 2A–D present various views of the assembly of FIGS. 1A–D with its bypass inlet latched open.

DETAILED DESCRIPTION

Figure 1D:
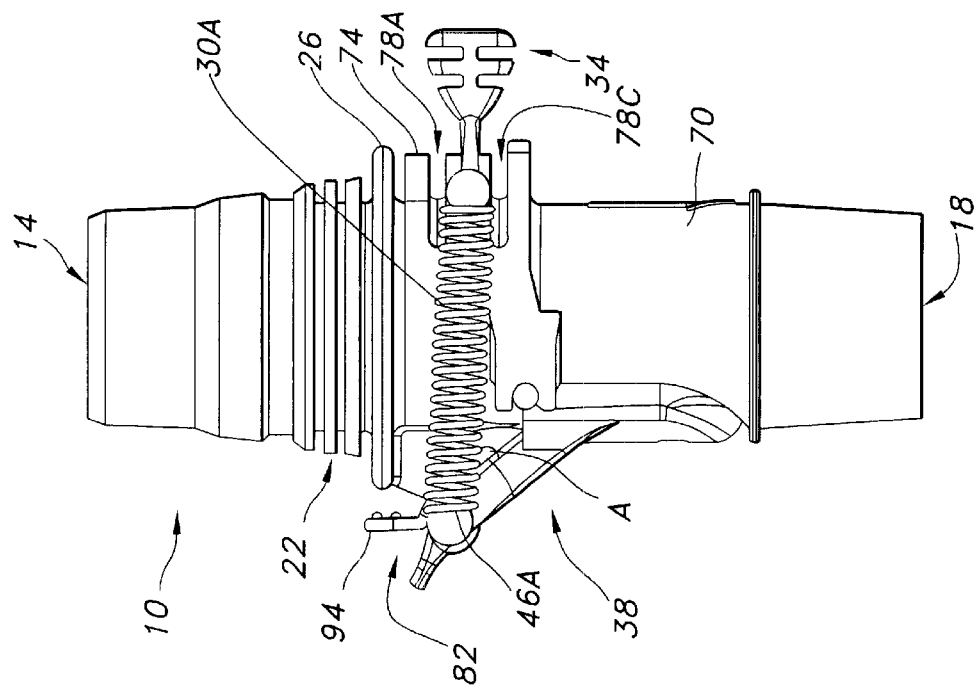
Figure 1C:
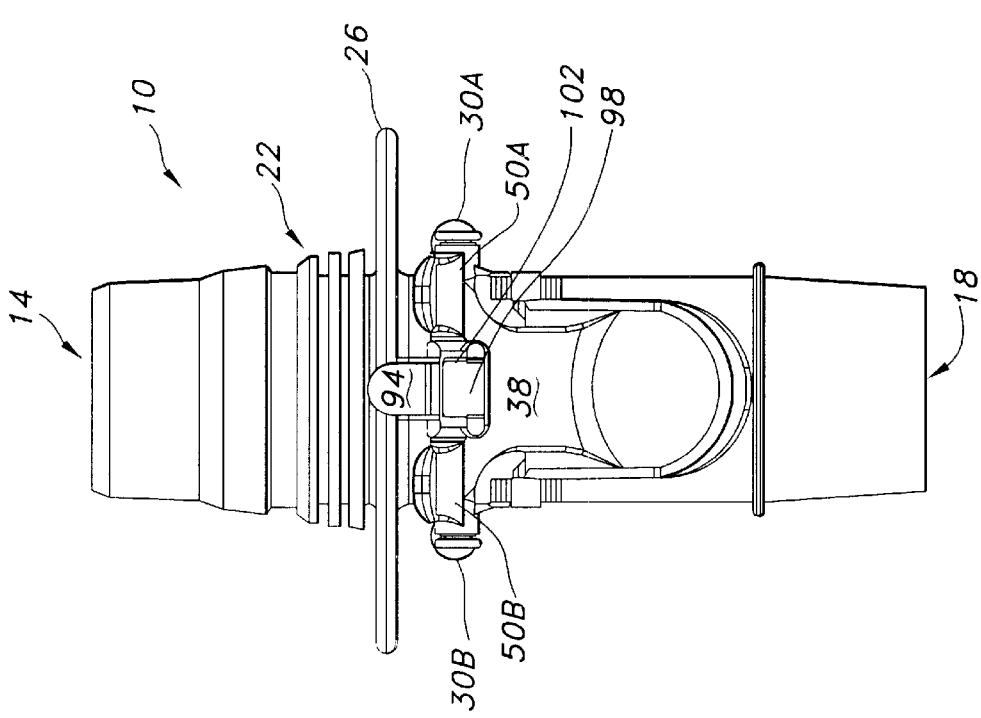

Detailed in FIGS. 1A–D is a version of an assembly 10 adapted to control, or regulate, fluid flowing therethrough. Assembly 10 may include an inlet 14 and an outlet 18, both shown in FIGS. 1A–D as being tubular. Neither inlet 14 nor outlet 18 need necessarily be so configured, however, as other shapes may be satisfactory. Nevertheless, in certain embodiments of assembly 10 useful for placement between lengths of hose or fittings used in swimming pools, the cylindrical natures of inlet 14 and outlet 18 facilitate their use. Likewise, optionally included as part of assembly 10 may be ribs 22 and plate 26, either or both of which may assist in positioning the assembly 10 in-line in, for example, a swimming pool cleaning system.

Figure 2D:
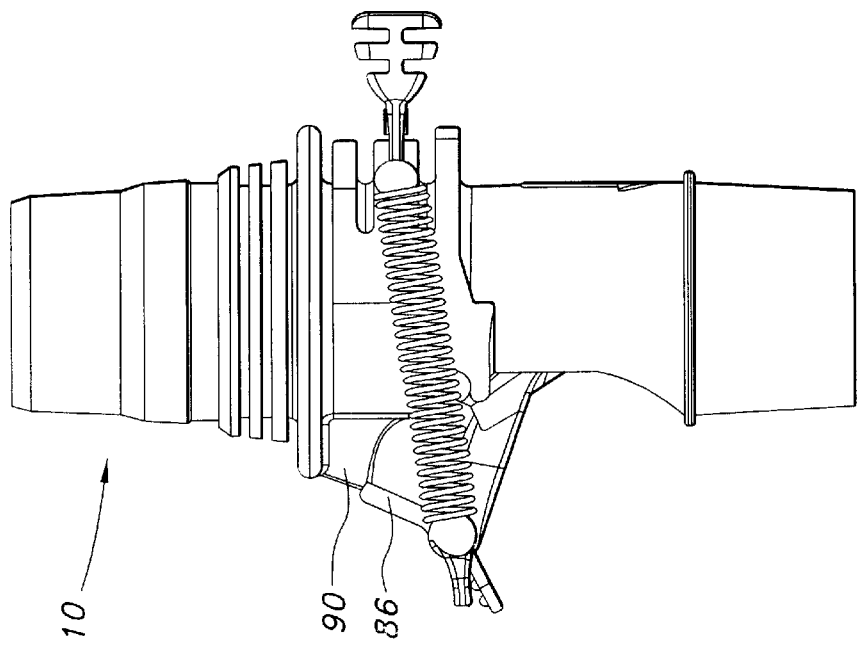
Figure 2C:
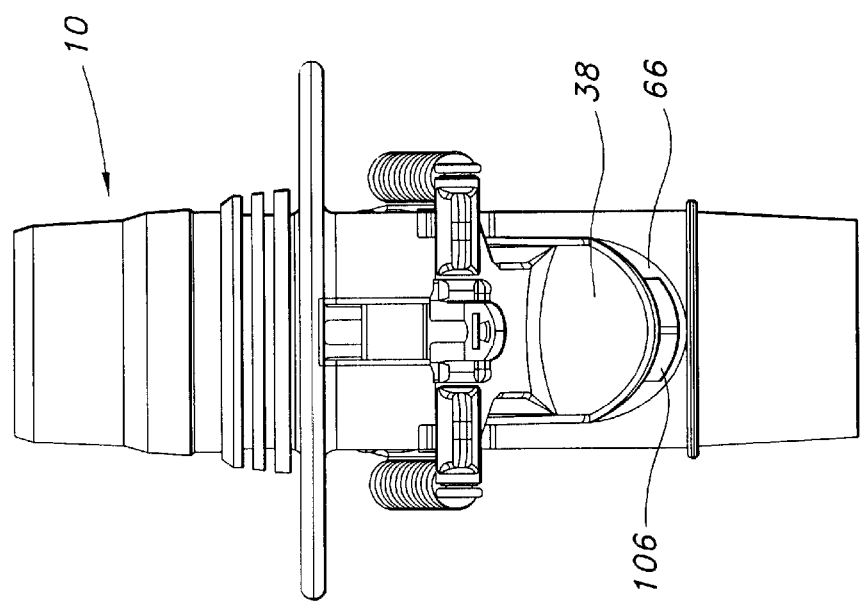

Also illustrated in FIGS. 1A–D are springs 30A and 30B, anchor 34, and cover 38. Springs 30A and 30B, either of which could conceivably be omitted in certain circumstances, form one of myriad types of resilient biasing means potentially suitable (as situations warrant) for use with the present invention. Each of springs 30A and 30B has a respective first end 42A or 42B adapted for connection to anchor 34. Springs 30A and 30B likewise have a respective second end, labelled 46A and 46B, intended to be attached to a respective arm 50A or 50B of cover 38. As a result, each spring 30A and 30B is connected between anchor 34 and cover 38, with the nominal spring force attempting to reduce the distance between the two. However, because anchor 34 and cover 38 are positioned opposite each other on (rigid) body 54, springs 30A and 30B tend to retain anchor 34 and cover 38 in their nominal positions (such as those shown in FIGS. 1A–D). By properly choosing the force of springs 30A and 30B, cover 38 may be made to pivot about prongs 58 (illustrated as positioned within collars 62 of body 54) and open bypass inlet 66 (see FIGS. 2A–D) when a particular diminished internal pressure within body 54 is achieved.

Nevertheless, the internal pressure drop required to cause cover 38 to pivot may be changed by repositioning ends 42A and 42B of springs 30A and 30B. Such repositioning may occur through movement of anchor 34 along exterior surface 70 of body 54. To facilitate this movement, certain embodiments of assembly 10 include series of walls 74 protruding from exterior surface 70, with pairs of the walls 74 defining grooves or slots 78 into which anchor 34 may be fitted. FIGS. 1A–D show anchor 34 fitted into the middle of three slots 78, resulting in springs 30A and 30B not being exactly horizontal when assembly 10 is oriented vertically (see, e.g., FIG. 1D). Were anchor 34 fitted instead in the (nominally) uppermost slot 78A of FIG. 1D, springs 30A and 30B would be more nearly horizontal. By contrast, were anchor 34 fitted into (nominally) lowermost slot 78C, springs 30A and 30B would be less nearly horizontal than when anchor 34 is fitted in the middle slot 78. Clear, therefore, is that so moving anchor 34 translates the position of ends 42A and 42B along exterior surface 70, changing the angle A that each of springs 30A and 30B makes with cover 38.

Latch mechanism 82 additionally appears in FIGS. 1A–D. Comprising at least tongue 86 (see FIGS. 2B and 2D) and groove 90, latch mechanism 82 is designed to lock cover 38 in place so that bypass inlet 66 is open. In some embodiments of assembly 10, mechanism 82 additionally includes tab 94 integrally formed with tongue 86 to provide an actuation mechanism. Further formed with tongue 86 and tab 94 may be partial collar 98, which may be friction-fitted onto and able to rotate about axle 102 intermediate arms 50A and 50B. Manually depressing cover 38 into bypass inlet 66 while depressing tab 94 causes tongue 86 to rotate and be received by groove 90. To release tongue 86 from groove 90, cover 38 may be depressed further into bypass inlet 66 and tab 94 manipulated opposite the direction it was depressed. Stop 106 (see FIG. 2C), finally, may be included as part of cover 38 and protrude so as to contact the interior surface of body 54 when bypass inlet 66 is closed. By doing so, stop 106 prevents cover 38 from extending sufficiently to reopen bypass inlet 66 inadvertently.

FIGS. 2A–D illustrate mechanism 82 functioning to maintain bypass inlet 66 operational indefinitely. Those skilled in the art will, of course, recognize that means other than mechanism 82 may be employed to accomplish this purpose if necessary or desired. Likewise, because the foregoing is provided for purposes of illustrating, explaining, and describing embodiments of the present invention, further modifications and adaptations to these embodiments will be apparent to those skilled in the art and may be made without departing from the scope or spirit of the invention. Finally, incorporated herein in its entirety by this reference is the Stoltz patent discussed earlier.

What is claimed is:

1. A flow-control assembly for use in a swimming pool cleaning system containing a water-flow hose, comprising:
   a. a body comprising (i) an inlet, (ii) an outlet, (iii) a bypass inlet, and (iv) means for connecting at least one of the inlet or outlet directly or indirectly to the water-flow hose;
   b. a cover positioned adjacent the bypass inlet and capable of moving from a first position in which it covers the bypass inlet to a second position in which the bypass inlet is at least partially open; and
   c. means for locking the cover in the second position.

2. An assembly according to claim 1 in which the locking means comprises a tongue connected to the cover and a groove, connected to the body, for receiving the tongue.

3. A flow-control assembly comprising:
   a. a body comprising (i) an inlet, (ii) an outlet, and (iii) a bypass inlet;
   b. a cover positioned adjacent the bypass inlet and capable of moving from a first position in which it covers the bypass inlet to a second position in which the bypass inlet is at least partially open; and
   c. means for locking the cover in the second position, such locking means comprising (i) a tongue connected to, and adapted to be rotated about at least part of, the cover and (ii) a groove, connected to the body, for receiving the tongue.

4. An assembly according to claim 3 further comprising a tab integrally formed with the tongue to facilitate manual rotation of the tongue.

5. An assembly according to claim 4 in which the cover comprises at least one arm, further comprising a spring having a first end connected to the arm.

6. An assembly according to claim 5 in which the spring has a second end, further comprising an anchor to which the second end of the spring is connected.

7. An assembly according to claim 6 in which the body further comprises a plurality of walls, adjacent walls defining therebetween at least one slot into which the anchor may be fitted.

8. An assembly according to claim 7 in which adjacent walls define therebetween a plurality of slots, the slots providing alternative locations into which the anchor may be fitted.

9. An assembly according to claim 8 in which the body is generally tubular in shape and thereby has a circumference, with the cover and anchor being positioned approximately one hundred eighty degrees apart on the circumference.

10. A flow-control assembly for use in a swimming pool cleaning system containing a water-flow hose, comprising:
   a. a body having an exterior and comprising (i) an inlet, (ii) an outlet, (iii) a bypass inlet, and (iv) means for connecting at least one of the inlet or outlet directly or indirectly to the water-flow hose;
   b. a cover positioned adjacent the bypass inlet and capable of moving from a first position in which it covers the bypass inlet to a second position in which the bypass inlet is at least partially open;
   c. an anchor;
   d. biasing means having a first end attached to the cover and a second end attached to the anchor; and
   e. means for placing the anchor in any one of alternative positions along the exterior of the body, with placement of the anchor in the alternative positions changing predominantly an angle formed by the biasing means and cover.

11. An assembly according to claim 10 in which the exterior of the body is generally tubular in shape.

12. An assembly according to claim 11 in which the biasing means comprises at least one spring.

13. An assembly according to claim 10 further comprising means for locking the cover in the second position.

14. An assembly according to claim 1 in which the locking means comprises a tongue directly or indirectly connected to the cover and a groove, directly or indirectly connected to the body, for receiving the tongue.

15. An assembly according to claim 1 in which the cover comprises at least one arm, further comprising a spring having a first end connected to the arm.

16. An assembly according to claim 15 in which the spring has a second end, further comprising an anchor to which the second end of the spring is connected.

17. An assembly according to claim 16 in which the body further comprises a plurality of walls, adjacent walls defining therebetween at least one slot into which the anchor may be fitted.

18. An assembly according to claim 17 in which adjacent walls define therebetween a plurality of slots, the slots providing alternative locations into which the anchor may be fitted.

19. An assembly according to claim 18 in which the body is generally tubular in shape and thereby has a circumference, with the cover and anchor being positioned approximately one hundred eighty degrees apart on the circumference.

20. A flow-control assembly comprising:
   a. a body having an exterior and comprising (i) an inlet, (ii) an outlet, and (iii) a bypass inlet;
   b. a cover positioned adjacent the bypass inlet and capable of moving from a first position in which it covers the bypass inlet to a second position in which the bypass inlet is at least partially open;
   c. an anchor;
   d. biasing means having a first end attached to the cover and a second end attached to the anchor;
   e. means for placing the anchor in any one of alternative positions along the exterior of the body, with placement of the anchor in the alternative positions changing predominantly an angle formed by the biasing means and cover; and
   f. means for locking the cover in the second position.

* * * * *